Dec. 3, 1957 A. J. WELLINGER 2,814,868
BUTTER SPREADER
Filed June 11, 1953

ARTHUR J. WELLINGER
INVENTOR.

BY

ATTORNEY

United States Patent Office 2,814,868
Patented Dec. 3, 1957

2,814,868

BUTTER SPREADER

Arthur J. Wellinger, Los Angeles, Calif.

Application June 11, 1953, Serial No. 360,929

1 Claim. (Cl. 30—124)

My present invention relates to butter spreaders to be used for spreading butter on food and it is particularly useful in spreading butter on ears of corn.

It is well known in the art to provide melted butter trays and straight butter knives to spread butter on ears of corn.

However, it has been a problem in the art to apply butter to corn without wasting the butter, without the necessity of melting or heating the butter so as to make it running and sloppy and to provide means for applying cold or even ice-cold butter to corn.

The usual prior procedure in spreading butter on an ear of corn is to take a slice of butter on a butter knife and then spread the butter on the ear of corn. During this process, the heat from the ear of corn generally causes the butter knife to become so hot that the butter cannot be manipulated with the knife, so that the butter falls onto the plate or table, or even onto the clothes of the one eating the corn.

It is therefore an object of my invention to provide a spreader for corn which will enable the user to apply ice-cold butter, or oleomargarine to corn without difficulty.

It is another object of my invention to provide a spreader which will apply butter to corn without getting the butter on the fingers of the person who is eating the corn.

It is another object of my invention to provide means for applying small or large quantities of butter to an ear of corn.

Other objects and advantages of my present invention will be apparent from the following description and claim, the novelty of my invention consisting in the features of construction, the combination of parts, the novel relations of the members and the relative proportioning, disposition and operation thereof, all as is more completely described herein and as is more particularly pointed out in the appended claim.

Figure 1:
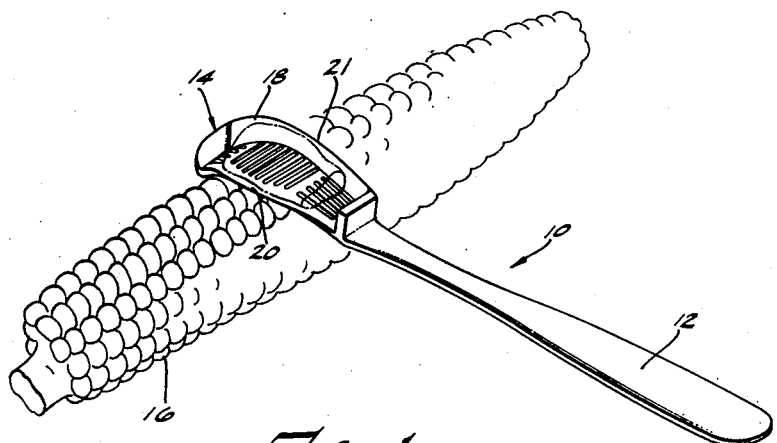
Figure 2:
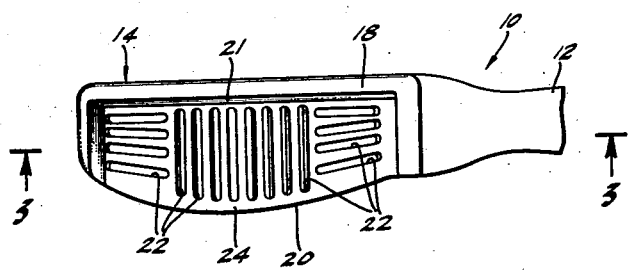
Figure 3:
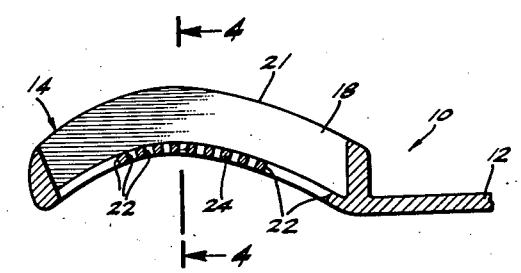
Figure 4:
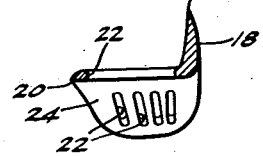

In the accompanying drawings, forming a part of my present specification,

Figure 1 is a perspective view showing a preferred form of my butter spreader in use, Figure 2 is a partial plan view of my spreader, Figure 3 is a longitudinal sectional view taken on lines 3—3 of Figure 2, Figure 4 is a vertical sectional view taken along the lines 4—4 of Figure 3.

Referring to my drawings, I provide a butter spreader 10 having a handle 12 that is provided with a curved end cup 14.

My butter spreader 10 is applied to an ear of corn 16 in the manner shown in Figure 1.

A retaining wall 18 on the curved end cup 14 of my butter spreader 10 serves to arrest and retain the butter after it has been sliced onto the top of my butter spreader by applying the cutting edge 20 opposite retaining wall 18, to a pad of butter. A second cutting edge 21 may be provided at the top of retaining wall 18 for cutting or scraping the butter from the pad if it is desired.

I provide slots 22 on the curved paddle portion 24 to permit the butter to move downwardly through the paddle portion 24 by slots 22 onto the rows of kernels of corn on the ear 16.

I will now describe my preferred method of operating my butter spreader. Preferably a thin slice of butter is taken on top of curved paddle 24 by slicing the advancing edge 20 of the paddle down on a butter pad or scraping it along the top of a butter pad. The butter will then move along the top of curved paddle 24 until it encounters the curved end cup 14, which serves to retain the butter. Also the horizontal or diagonal edges of slots 22 serve to retain parts of the butter.

It is then only necessary to rub the butter spreader along the top of the ear of corn 16 to cause the butter to move downwardly through slots 22 onto the corn, the heat of the ear of corn melting the butter so that it will flow. I prefer to tilt the ear of corn in such a manner that end cup 14 is directed downwardly so that the butter will not tend to slide off of my butter spreader in operation.

The curvature of paddle portion 24 of my preferred embodiment is of a sufficiently wide arc to accommodate an ear of corn of any dimension, no matter how large. If butter is being spread on a relatively small ear of corn my spreader may then be held at an angle to the ear of corn which is suitable to bring most of the bottom surface of paddle portion 24 into flush contact with the ear of corn in order to most quickly heat and melt the butter on the spreader.

It is to be understood that the form of my invention herein shown and described is my preferred embodiment and that various changes in the shape, size and arrangement of parts may be resorted to without departing from the spirit of my invention, or the scope of the appended claim.

I claim:

A butter spreader for applying butter to an ear of corn including an elongated handle, an elongated blade, integrally connected at one of its ends to one end of said handle, a cutting edge formed along one of the longitudinal edges of said blade, a continuous retaining wall integral with and mounted on the upper side of said blade and extending along both ends and the other longitudinal edge of said blade, and a plurality of openings through said blade, said blade being longitudinally curved to provide a downwardly facing concavity on its lower side, whereby said butter spreader may be used to spread melted butter on a hot ear of corn by gripping said handle in the hand, cutting a slice of butter onto said upper side of said blade with said cutting edge from a source of solid butter, placing a substantial portion of the curved lower side of said blade in direct contact with the ear of corn, rubbing said blade along the ear of corn in contact with the corn, and keeping said lower side of said blade in direct contact with said corn for a sufficient amount of time to permit the butter on said upper side of said spreader to be melted by heat conducted from said corn through said blade, the melted butter then flowing through said openings onto said corn.

References Cited in the file of this patent

UNITED STATES PATENTS

| D. 71,016 | Hill | Sept. 7, 1926 |
|---|---|---|
| D. 157,183 | Newell | Feb. 7, 1950 |
| 433,546 | Smith | Aug. 5, 1890 |
| 1,494,018 | Randolph | May 13, 1924 |
| 1,781,973 | Bolton | Nov. 18, 1930 |
| 1,834,555 | Tittle | Dec. 1, 1931 |
| 2,527,149 | Peterson | Oct. 24, 1950 |
| 2,556,092 | Kimball | June 5, 1951 |
| 2,606,364 | Gustafson | Aug. 12, 1952 |

FOREIGN PATENTS

| 124,313 | Switzerland | Feb. 16, 1928 |
|---|---|---|